Sept. 18, 1962  G. N. HATSOPOULOS ETAL  3,054,914
PROCESS AND APPARATUS FOR CONVERTING THERMAL
ENERGY INTO ELECTRICAL ENERGY
Filed March 24, 1958  3 Sheets-Sheet 1

INVENTORS
GEORGE N. HATSOPOULOS,
JOSEPH KAYE
BY
Benjamin Sweedler
ATTORNEY

Sept. 18, 1962  G. N. HATSOPOULOS ETAL  3,054,914
PROCESS AND APPARATUS FOR CONVERTING THERMAL
ENERGY INTO ELECTRICAL ENERGY
Filed March 24, 1958  3 Sheets-Sheet 2

INVENTORS
GEORGE N. HATSOPOULOS,
JOSEPH KAYE
BY
Benjamin Sweedler
ATTORNEY

○ THERMAL EFFICIENCY
○ POWER OUTPUT

INVENTORS
GEORGE N. HATSOPOULOS,
JOSEPH KAYE
BY
ATTORNEY

United States Patent Office 3,054,914
Patented Sept. 18, 1962

1

3,054,914
PROCESS AND APPARATUS FOR CONVERTING THERMAL ENERGY INTO ELECTRICAL ENERGY
George N. Hatsopoulos, Lexington, and Joseph Kaye, Brookline, Mass., assignors to Thermo Electron Engineering Corporation, a corporation of Delaware
Filed Mar. 24, 1958, Ser. No. 723,336
19 Claims. (Cl. 310—4)

This invention regulates to processes and apparatus for converting thermal energy into electrical energy, and more particularly to processes and apparatus which do not require any moving mechanical parts for effecting such conversion.

The use of turbogenerators, steam power plants, internal combustion engines, ionized gas or vapor media, thermocouples or thermopiles, as instrumentalities for effecting the conversion of thermal energy into electrical energy, is, of course, well known. These heretofore known techniques for converting thermal energy into electrical energy have certain disadvantages, among the more important of which may be mentioned:

Turbogenerators, steam power plants, internal combustion engines, etc. involve expensive boilers, complex auxiliary equipment and controls which necessitate a heavy initial investment, and are expensive to maintain and operate. Techniques involving ionized gaseous or vapor media require the continuous operation of large vacuum pumps which are expensive to install, maintain and operate. While the use of thermocouples or thermopiles eliminates the necessity of using mechanically moving parts, they have the disadvantages of being relatively inefficient in operation and yielding relatively low voltages per unit weight and/or volume of equipment.

It is among the objects of the present invention to provide processes and apparatus for converting thermal energy into electrical energy, which processes require for their practice apparatus of comparatively simple and compact design and of relatively low cost in that the apparatus is devoid of intricate parts.

It is another object of the present invention to provide such processes and apparatus which are relatively efficient in that they give large power outputs per unit weight and/or volume of equipment, which are relatively inexpensive to install, maintain and operate, particularly in that they do not involve any mechanically moving parts, and which result in high current densities, high power densities and high thermal efficiencies.

Still another object of this invention is to provide processes and apparatus for converting thermal energy into electrical energy in which voltage-multiplication effects are obtained with consequent increase in the voltage output and/or power output and thermal efficiency of such converters.

Still another object of this invention is to provide a process of converting thermal energy efficiently, which process, without deleterious effect on its efficiency, involves the use of differential temperatures with the lower temperature still sufficiently high to permit utilization of heat derived therefrom for use in generating steam, e.g., in steam power plants, or for conversion into electrical energy in thermocouples or thermoelectric engines, thus materially increasing the overall efficiency.

Still another object of the present invention is to provide such converters which in operation require little or no supervision, and, hence, result in a saving in labor required for their operation.

Still another object of the present invention is to provide such converters which can utilize directly any available high temperature source, resulting in high Carnot efficiency.

2

Still another object of the present invention is to provide such converters which are particularly adapted to utilize the heat generated in nuclear reactions to convert such heat into electrical energy. Hence, this embodiment of the present invention is particularly applicable for use as nuclear power plants.

Another object of this invention is to provide for conversion of thermal energy into electrical energy utilizing the heat generated by decomposition of radio-active isotopes as the source of heat converted into electrical energy.

Still another object of the present invention is to provide such converters which can operate at temperatures much higher than those which can be used in commonly available thermocouples or thermopiles (usually operate at temperatures below about 1200° F.) and with considerably higher efficiencies than are obtainable in such commonly available thermocouples or thermopiles. This aspect of the invention enables its use in combination with such thermocouples or thermopiles, employing heat which would otherwise be waste or residual heat from such converters, to supply the heat necessary to operate such thermocouples or thermopiles.

Still another object of the present invention is to provide such converters which are capable of operating efficiently for relatively long periods of time, i.e., have relatively long life.

Another object of the present invention is to provide such converters which can utilize A.C. current to generate heat and use this heat in the production of D.C. current with zero ripple and with any voltage, within practical limits. Hence, this embodiment of the invention provides an excellent and relatively inexpensive rectifier for converting alternating to direct current.

Still another object of the present invention is to provide such converters which utilize a D.C. current source at a given voltage as a source of heat to produce D.C. current with zero ripple and at any desired voltage, within practical limits.

Still another object of the present invention is to provide such converters which furnish electrical power to operate electronic equipment in missiles, satellites, and space travelling devices, etc.

In accordance with this invention, thermal energy from any available source is converted into electrical energy by heating one of two parallel electron emissive surfaces (which heating surface, for convenience, is hereinafter referred to as the "hot surface" or "hot plate") spaced from the other surface (hereinafter referred to as the "cooler surface" or "cooler plate") a distance, not more than about 0.002 inch, preferably not more than about 0.0005 inch. The hot surface is heated to a temperature of at least 1800° F., desirably within the range of from 1800° to 4000° F., preferably from 2000° to 3000° F., the temperature to which it is heated depending chiefly on the source of heat available and its material of construction. The cooler surface is maintained at least 350° F. below the temperature of the hot surface, preferably from 400° to 500° F. below the temperature of the hot surface. Its temperature may be from 85° F. to 1500° F.

The hot surface should have a work function of not greater than approximately $15kT_1$, in which expression $k$ is Boltzmann's constant ($0.861 \times 10^{-4}$ volts per degree Kelvin) and $T_1$ is the maximum temperature in degrees Kelvin to which the hot electron emissive surface is heated in use. For optimum efficiencies, the cooler electron emissive surface should have a work function as low as possible. The work function of the cooler electron emissive surface should be not greater than that of the hot surface and therefore not greater than $15kT_1$, in which $k$ is Boltzmann's constant and $T_1$ is the maximum temperature in degrees Kelvin of the hotter surface in use.

The parallel hot and cooler electron emissive surfaces are maintained under a vacuum of at least $5 \times 10^{-5}$ mm. of mercury. When inert gas, such as helium, krypton, argon, neon, xenon or a mixture of these gases, is present the vacuum may be of the order of $10^{-1}$ or lower.

By observing the above noted conditions, current can be withdrawn from the hot and cooler electron emissive surfaces at relatively high efficiencies.

For a fuller understanding of the nature and objects of the invention, reference should be had to the following detailed description taken in connection with the accompanying drawings showing, for purposes of exemplification, preferred forms of this invention without limiting the claimed invention to such illustrative instances, and in which:

FIGURE 3 is a perspective view, partly broken away to show the interior structure, of another embodiment of this invention;

FIGURE 4 is a diagrammatic view showing the relative relationship and electrically conductive connections between the hot and cooler electron emissive surfaces involved in the embodiment of FIGURE 3;

Figure 9:
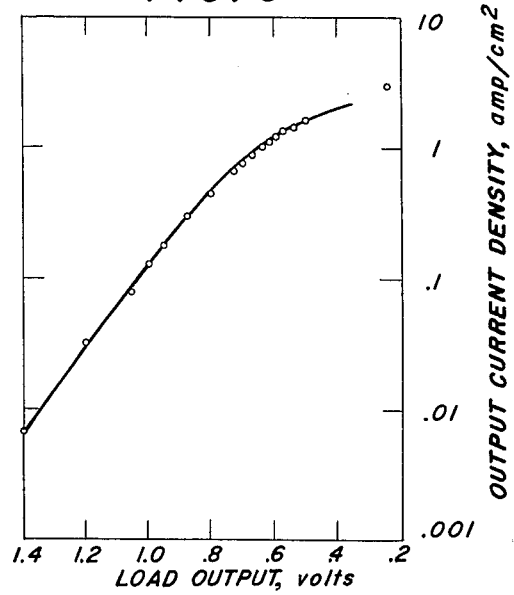
Figure 10:
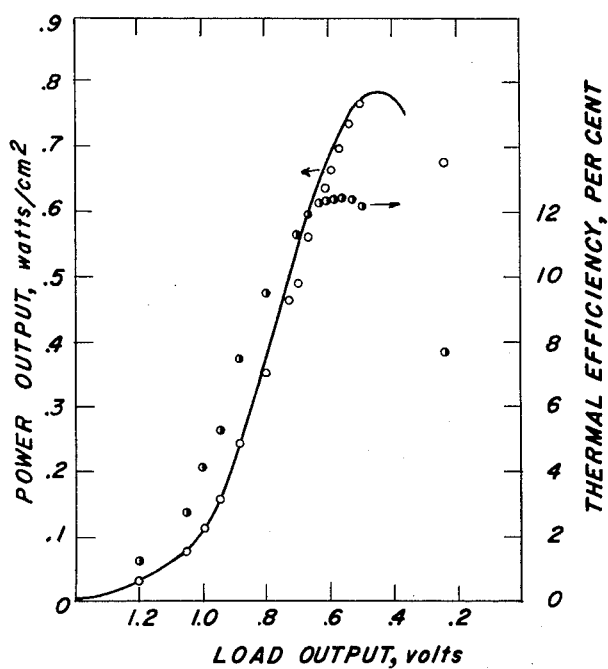

FIGURE 9 is a plot based on experimental results in a pilot plant converter embodying this invention of the load output of the converter in volts relative to the output current density in amperes per square centimeter of hot plate surface; and FIGURE 10 is a plot on the same pilot plant converter showing the load output in volts relative to percent thermal efficiency and also relative to power output in watts per square centimeter of hot plate surface.

It is noted that FIGURES 1 to 8 of the drawings are not to scale because of the necessity of illustrating the spacing between the hot and cooler plates, which spacing is so small (not greater than 0.002 inch and preferably not greater than 0.0005 inch) that it is not possible to show same and have the drawings to scale or near scale.

Figure 1:
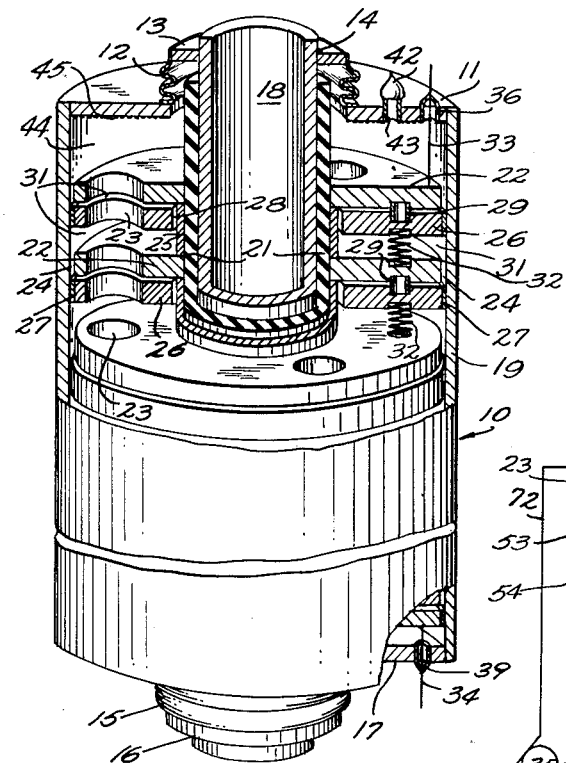
FIGURE 1 is a perspective view, partly broken away to show the interior structure, of one embodiment of this invention.

FIGURE 1 of the drawings shows a converter or thermo-electron engine involving multiplication-effects of the voltage generated and which is designed to permit changing the spacing between the hot and cooler plates to facilitate activation, as will be explained more fully hereinafter. In FIGURE 1, 10 is a housing which may be evacuated and sealed so that the desired vacuum is maintained therein. Alternatively, housing 10 may communicate with a vacuum pump or, where a series of converters are used, with an accumulator, in turn communicating with a vacuum pump to maintain the desired vacuum in this housing. Since vacuum pumps and accumulators are well known, they are not illustrated in the drawings.

Secured to the top 11 of housing 10 by a bellows 12 is a top closure 13 having a central opening 14. Bellows 15 secures the base closure 16 to the base 17. A duct or flue 18 extends through the aligned openings in the top closure 13 and base closure 16 with its axis coincident with that of housing 10. In the modification of FIGURE 1, this flue extends through the housing 10 and has one end communicating with a source of heat and the other end communicating with a duct which may lead to a regenerator, waste heat boiler, etc. In the embodiment of the invention involving the use of a static body of isotopes which decompose and in so doing generate heat, such body may be disposed in flue 18 and the opposite ends sealed. Examples of such isotopes are: ruthenium 106, cerium 144, pollonium 210, cesium 127, uranium 238, strontium-yttrium decay products and mixed fission products, which are now considered waste material and burdensome to get rid of. When using such isotopes the housing 10 is suitably shielded to prevent injury to personnel by harmful rays.

Bellows 12 and 15 between the top closure 13 and the top 11 and the base closure 16 and the base 17 thermally isolate the hot flue 18 from the cooler wall 19 of housing 10, i.e., they minimize transfer of heat from hot flue 18 to wall 19.

A cylindrical heat-conducting electrical insulator 21 is mounted contiguous to the flue 18 and extends substantially the full length of this flue terminating short of the top closure 13 and the base closure 16. Electron emissive surfaces 22 are positioned in heat-conducting relationship with insulator 21 at spaced points along its length. For brevity and convenience of description, these electron emissive surfaces will be hereinafter referred to as plates; the plates which are heated will be called the hot plates and the cooperating plates at lower temperatures, the cooler plates. Hot plates 22 are in direct heat exchange relation with the flue 18 through the wall of the flue and the heat-conducting insulator 21. In the embodiment of the invention shown in FIGURE 1, these plates are in the shape of circular discs provided with a plurality of spaced degassing holes 23. While in the embodiment shown in FIGURE 1, three such holes spaced approximately 120° apart are shown, it will be understood that any desired number of such degassing holes may be provided in each plate 22.

The outer peripheries of the hot plates 22 are spaced from the inner wall of housing 10 as at 24. Suitable spacers 25 of heat-conducting, electrical insulating material, desirably in the form of collars, separate one hot plate 22 from the next hot plate 22 in housing 10.

A series of cooler plates 26 also in the form of discs are mounted with their outer peripheries in heat transfer relationship but electrically insulated relative to the inner wall of housing 10. For this purpose ceramic heat-conducting annular electric insulators 27 separate the peripheries of cooler plates 26 from the inner surface of wall 19. Cooler plates 26 are, however, fixed to wall 19 through the insulators 27. In this way, radiation, conduction and convection taking place through the wall 19 aid in maintaining the cooler plates 26 at the desired temperature. The inner periphery of each cooler plate 26 is spaced from the adjacent collar 25 as at 28, which evacuated space 28 aids in minimizing heat transfer to the cold plates.

The plates 22 and 26 desirably are from about 1/8" to 1/4" thick, parallel to each other, and have a diameter where circular plates are employed of from about 2" to 4". In the case of thinner plates, the diameter is less and for thicker plates the diameter may be greater, i.e., 4" for a 1/4" thick plate and 2" for a 1/8" thick plate. The ratio of thickness to length (e.g., diameter for circular plates) should be such that in use the temperature drop from one end of the plate to the opposite end is less than about 200° F. It will be understood the above dimensions are the optimum for presently available electron emissive materials and this invention is not to be limited to these dimensions.

Ceramic spacers 29 are disposed between each pair of plates consisting of a cooler plate 26 and a superimposed hot plate 22. Desirably, approximately three such ceramic spacers 29 are employed between each pair of cooler plates 26 and hot plates 22 spaced circularly approximately 120° apart, although any desired number of such ceramic spacers may be employed. These spacers are cylindrical in shape and are mounted in countersunk depressions in the pair of hot and cooler plates which they serve to maintain spaced parallel to each other a distance not exceeding 0.002 inch, preferably not greater than 0.0005 inch. The countersunk openings in which the spacers are mounted permit movement of the plates during activation to increase the distance between them sufficiently to permit relatively rapid evolution and removal of gases evolved during activation, as will be explained more fully hereinafter.

Within the housing 10 the pairs of cooperating cooler and hot plates are arranged in succession with the lower cooler plate 26 of each pair separated from the upper hot plate of the succeeding pair by a space 31. Disposed in this space are two or more electrically conducting springs 32. These springs, which seat in countersunk openings in the respective cooler and hot plates, are spaced circularly, desirably equidistant from each other, e.g., 120° apart when three such springs are used, function to force the cooler or hot plate, as the case may be, towards its cooperating hot or cooler plate of the pair to maintain the desired spacing between them, which spacing is controlled by the ceramic spacers 29. As indicated, springs 32 also function as conductors to conduct the charge from one series of hot and cooler plates to the next.

Figure 2:
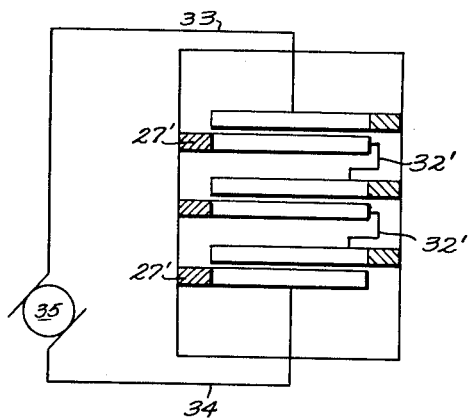
FIGURE 2 is a diagrammatic view showing the relative relationship and electrically conductive connections between the hot and cooler electron emissive surfaces involved in the embodiment of FIGURE 1.
Figure 6:
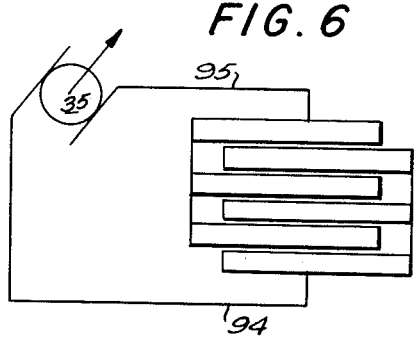
FIGURE 6 is a diagrammatic view showing the relative relationship and electrically conductive connections between the hot and cooler electron emissive surfaces involved in the embodiment of FIGURE 5.

The topmost hot plate and the lowermost cooler plate of the series are provided with conductors 33, 34 (FIGURES 1 and 2) respectively, in circuit with a load 35. Electrical conductor 33 leads from the top hot plate of the assembly through a seal 36 to load 35. Electrical conductor 34 leads from the base cooler plate of the assembly through seal 39 to this load. In FIGURE 2, 27' indicates electrical insulation maintaining the plates insulated from each other (corresponding to insulators 27 of FIGURE 1 in the case of the cooler plates) and 32' are conductors (corresponding to springs 32) connecting one cooler plate to a hot plate thereabove.

Any desired number of pairs of hot and cooler plates, depending upon the desired output voltage, may be disposed in a single housing. In the structure of FIGURE 1, the pairs of hot and cooler plates are connected in series, as diagrammatically illustrated in FIGURE 2, so that the voltage generated in one pair of hot and cooler plates builds up on the next pair, etc., until the last pair (in the embodiment of FIGURES 1 and 3, the top pair) is reached. The output voltage is directly proportional to the number of pairs of hot and cooler plates within the housing.

In the structure of FIGURE 1, only one face of the hot plate is provided with a surface of electron emissive material, the cooler plates 26 each have one surface only of electron emissive material and these surfaces on each pair of hot and cooler plates are disposed facing and parallel to each other.

A suitable seal 42 seals the opening 43 communicating with the top space 44 in the housing 10. Disposed in this top space 44 is a getter material 45, e.g., barium, which absorbs whatever gases may be released from the activated electron emissive surfaces. The getter material may be coated on the walls of the housing, say at or near the top of the housing, or may be in the form of a separate member suitably disposed in housing 10.

When activating the electron emissive surfaces, seal 42 is open, and the interior of housing 10 is then connected to an accumulator under vacum or directly to a vacuum pump. Flue 18 is held fixed by any suitable means, e.g., the converter may be disposed in a frame which supports the ends of flue 18 so that they are held fixed. Housing 10 is then moved downwardly. This effects movement of the cooler plates fixed to the housing relative to the hot plates, thus increasing the spacing between the plates sufficiently to facilitate escape of gases evolved during the activation. Springs 32 are further compressed during this movement of housing 10 and the top bellows 12 is expanded while the bottom bellows 15 is compressed. The spacers 29 seated in the countersunk openings in the cooperating hot and cooler plates, and maintained in these openings by springs 32, as well as the depths of the countersunk openings, are such as to permit the desired maximum increase in the spacing with the ends of spacers 29 disposed at all times in their countersunk openings. As soon as the force which effects movement of housing 10 is removed, the parts return automatically to their position occupied by them in steady-state operation with each pair of hot and cooler plates spaced apart not more than 0.002 inch, preferably not more than 0.0005 inch.

While maintaining the hot and cooler plates spaced apart the added distance to facilitate evolution of gases during activation, the heating medium is passed through flue 18. The converter is thus heated to final temperature of about 200° F. above the steady-state operating temperature of the converter. Heating at this elevated temperature takes place for only a few minutes, and insures the removal of substantially all gases and vapors from the electron emissive material. Activation is continued until no more gases escape from the converter. It is carried out under a vacuum of from about $5 \times 10^{-5}$ to $5 \times 10^{-6}$ mm. of Hg. Higher vacuum can, of course, be used but it is not necessary and hence it is wasteful to employ higher vacuums. The time of activation will depend on the electron emissive materials employed, the vacuum conditions maintained during the activation, the spacing between the hot and cooler emissive surfaces. It may be accomplished in about three hours or longer. Where close spacing of the hot and cooler electron emissive surfaces are maintained, the evacuation may require a week's time and even longer. It will be appreciated that the spacing between each pair of hot and cooler plates need not be increased during activation but by so doing the activation time is greatly reduced and complete activation is insured.

During the activation, emitted gases and vapors flow through the degassing holes 23, enter the top manifold space 44 and leave the housing through opening 43 which, as noted, communicates with an accumulator under vacuum or with a vacuum pump.

After the activation has been completed, evidenced, as noted, by the cessation of gas emission from the electron emissive surfaces, seal 42 is applied to seal opening 43 after the interior of container 10 has been placed under the desired vacuum. The higher this vacuum is, the better. Satisfactory operation takes place in a vacuum within the range of $5 \times 10^{-5}$ to $1 \times 10^{-7}$ mm. of mercury where no inert gases are present. With inert gases (the noble inert gases above mentioned) present, the vacuum should be below $10^{-1}$ mm. of mercury.

During steady-state operation, the hot plates of each pair of plates 22, 26 heated by thermal energy from flue 18 emit electrons which flow to the cooler plate 26 of the pair. The voltage thus created builds up from one pair of plates to the next pair from bottom to top of the converter. D.C. current with zero ripple will thus flow through the conductors 33 and 34 in circuit with load 35.

Like parts in the several modifications disclosed are identified by the same reference numbers. The modification of FIGURE 3, like that of FIGURE 1, is designed for external application of a moving force to increase the spacing between the hot and cooler electron emissive surfaces during activation, as will be more fully explained hereinafter.

In FIGURE 3 any desired number of groups of three plates consisting of one intermediate hot plate 51 sandwiched between two cooler plates 52, 53 are mounted on heat-conducting electrically insulating member 21 contiguous to flue 18. As these groups are substantially alike, only one will be discussed in detail. The spacing between the top surface of the hot plate 51 and the base of the cooler plate 52 immediately thereabove is not greater than 0.002 inch, preferably 0.0005 inch. Similarly, the spacing between the base surface of the hot plate 51 and the top of the cooler plate 53 immediately therebelow is within these values. The hot plates are provided with degassing openings 23; the cooler plates may also be provided with such openings but they are not necessary for the cooler plates in the construction of FIGURE 3 because the electron emissive surfaces thereof are disposed contiguous to evacuated zones or areas through which the emitted gases may escape.

In FIGURE 3, a bellows 54 extends from the cooler plate 52 to the other cooler plate 53 of each group and encloses the hot plate 51 between these two cooler plates. Bellows 54 is annular with its top wall 55 and bottom wall 56 welded to the periphery of the cooler plates 52 and 53 respectively as at 55 and 56, respectively. Each cooler plate 53 is provided with spaced cylindrical openings 57. In the modification of FIGURE 3, three such openings are employed spaced 120° apart. It will be appreciated any desired number of such openings may be used. In each opening 57 is mounted a ceramic spacing member 58, best shown in FIGURE 7. It is shaped to the form of a cup or cylinder having cylindrical walls 59 provided with flanges 60 resting in an annular groove 61 in the cooler plate 53, in order to yield minimum heat transfer between hot and cooler plates. A supporting member 62 extends from the base of the cylindrical member 58 to a height equal to the height of the side walls 59. Supporting member 62 has its top 63 centrally disposed relative to walls 59. A shim 64 rests on the top of upstanding supporting member 62 and engages the underside of the hot plate 51. With this construction, when differential temperatures are encountered in operation, the expansion or contraction of the side walls 59 is compensated for by the expansion and contraction, respectively, of the supporting member 62, of equal length to that of the side walls 59, thus maintaining the hot plate 51 properly spaced relative to the cooler plate 52 at all times during operation. It will be appreciated, these spacers are employed in the lowermost cooler plate of each group of three of all groups of the converter of FIG. 3.

Similar spacers may be mounted on each top cooler plate 52 of each group, to space it relative to the hot plate 51 therebelow. Alternatively, spacers 29, shown in FIGURES 1 and 8, or other suitable ceramic spacers which minimize transfer of heat, may be employed for this purpose.

As in the modification of FIGURE 1, the cooler plates 52, 53 have their inner peripheries spaced from the heat-conducting insulating material 21 surrounding the heating flue 18 and are thus effectively insulated from the source of heat employed to heat the hot plates 51. The latter have their peripheries spaced from the bellows 54 and are by this space thermally insulated from the bellows which constitute the outer wall of the converter in heat exchange relation with an atmosphere. The bellows 54 being fixed to cooler plates 52 and 53 aid in maintaining these cooler plates at the desired temperature differential relative to that of the hot plates 51.

Each group of hot and cooler plates is spaced from the next group of the assembly by a pair of ceramic annular rings 66 and 67 between which is fixed a bellows 68. Thus a flexible annular seal 69 is formed between contiguous groups, each of which groups consists of one hot plate sandwiched between two cooler plates and enclosed in a bellows 54. Seal 69 permits relative movement between one group and the next to increase the spacing between the hot and cooler plates during activation, the bellows 68 being contracted for this purpose and this without interrupting the vacuum in the converter. It will be appreciated that the converter of FIGURE 3 is provided with a seal, similar to 42 of FIGURE 1, so that it can be evacuated, and the portion thereof the outer periphery of which is defined by top sealing plate 13, bellows 12, top plate 52, bellows 54 of all groups, seals 69 between adjacent groups, bellows 15 and base closure 16, and the inner periphery of which portion is defined by the outer wall of cylinder 21 and of flue 18 extending beyond the extremities of flue 18, is under vacuum when the converter is in operation.

An electrically conducting coil spring 71 is mounted between the hot plate 51 of one group of three plates and the topmost cooler plate of the next group therebelow in the modification of FIGURE 3. This spring not only serves to conduct the charge from one group of three plates to the next higher group but also functions to force the hot plate against the spacers between it and the cooler plate immediately thereabove, and also to force the topmost cooler plate immediately therebelow against which it abuts against the hot plate immediately below this cooler plate, to maintain the desired spacing during steady-state operation.

A lead conductor 72 (FIGURES 3 and 4) leads from the bellows 54 enclosing the topmost group, and a conductor 73 leads from the hot plate 51 of the lowermost group through a seal 74 to the load 35. Bellows 54, it will be appreciated, is in electrical communication with the cooler plates to which it is secured. The converter of FIGURE 3 is provided with getter material (not shown) in its interior and the parts are dimensioned substantially the same as the corresponding parts of FIGURE 1, except the hot plates 51 are about twice as thick as the hot plates 22 of FIGURE 1. In FIGURE 3, flue 18 and hot plates 51 mounted thereon are held fixed while the cooler plates 52 and 53 of each group are moved relatively to the hot plate therebetween, to increase the distance between the electron emissive surface of each hot plate relative to the cooler plate above and below. The bellows 12, 15, 54 and 68 permit such relative movement. Activation takes place more readily as hereinabove described in connection with FIGURE 1.

During activation gases evolved from each lower cooler plate pass through the gassing holes 23 in the hot plate thereabove as well as around the periphery of this hot plate. Gases which escape from the base surface of the hot plate follow a similar path of flow. Emitted gases from the top cooler plate and from the top surface of the hot plate of each group flow into the space 75. In the case of the groups below the top group, the emitted gases flow through the sealed space 76 connecting adjacent groups, then through the space of the next group above, beneath and around the outer periphery of the hot plate therein, as well as through the gassing holes 23 in this hot plate, then through space 75, etc., until the emitted gases pass through the top group from the space 75 from which they are evacuated by the vacuum pump.

During steady-state operation, after evacuation, electrons flow from each hot plate to the cooler plate on opposite sides thereof. The voltage thus created builds up from one group to the next through the connecting coil spring conductor 71 which transfers the voltage from the cooler plates electrically connected by bellows 54 of each lower group to the hot plate of the group above. The current thus generated is taken off through conductors 72 and 73 communicating with load 35.

Figure 5:
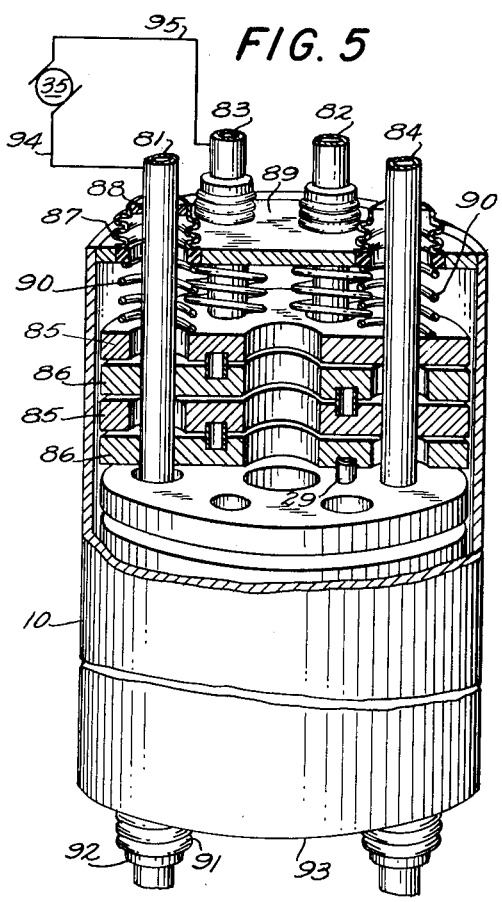
FIGURE 5 is still another perspective view, partly broken away to show the interior structure, of still another modification embodying this invention.

The converter or thermo-electron engine of FIGURE 5 is not designed for external application of forces to increase the spacing between the hot and cooler electron emissive surfaces during activation. Activation of this modification may take place by heating the electron emissive surface under vacuum for the considerably longer time, a week or more, required to activate the electron emissive surface. Alternatively, the electron emissive surfaces separated or widely spaced apart may be activated, the activated surfaces assembled in an inert atmosphere, say helium or argon, and the assembled equipment then evacuated.

Figure 7:
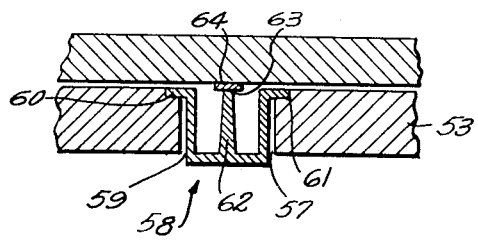
FIGURE 7 is a vertical section on a greatly enlarged scale showing the spacer between the hot and cooler plates.
Figure 8:
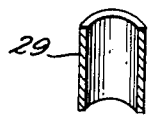
FIGURE 8 is a perspective view on a greatly enlarged scale showing another form of ceramic spacer between the hot and cooler electron emissive plates.

In the structure of FIGURE 5, two ducts 81, 82 are provided for the heating medium and two other ducts 83, 84 are provided for the flow of a cooling medium therethrough. In this modification, the cooler plates 85 are disposed in heat exchange relation with the ducts 83, 84, and the hot plates 86 in heat exchange relation with the ducts 81, 82. Ceramic spacers similar to those of FIGURE 7 or 8 are provided between each cooler plate and its associated hot plate. To maintain the plates in desired spaced relation springs 90 are employed bearing against the top plate 85 and the underside of top 89 of housing 10. In the embodiment shown in FIGURE 5, these springs are concentric with the ducts 81, 82, 83 and 84. The plates are arranged in alternation with a cooler plate 85 alternating with a hot plate 86 along the full length of the housing 10.

Bellows 87 connect the top closure discs 88 with the top 89 of the housing 10. Similarly, bellows 91 connect the base closure discs 92 with the base 93 of the housing 10. These bellows allow for thermal expansion and contraction in operation.

All the hot plates 86 are connected by electrical conductor, which in FIGURE 5 is the wall of duct 81. All the cooler plates are similarly connected by an electrical conductor consisting of the wall of duct 83. Leads 94 and 95 (FIGURES 5 and 6) lead from ducts 81 and 83, respectively, and communicate with the load 35. Thus, the hot plates are connected in parallel with each other and the cooler plates are connected in parallel to each other. High D.C. current with zero ripple at low voltage results.

Cooling of the cooler plates as in FIGURE 5, can of course be used in the modification of FIGURES 1 and 3 in which the groups of plates are connected for voltage multiplication effects. Utilization of a heat transfer medium to remove heat from the cooler plates (which heat would otherwise be wasted) lends itself particularly to use in conjunction with thermocouples which usually operate at temperatures below 1200° F. Thus, for example, a cascade of thermocouples operating within the range of from, say, 100° to 1200° F. may be used, and the converter of this invention operated at a high efficiency with the cooler plates maintained at a temperature somewhat above 1200° F. The heat transfer media passed in heat exchange relation with the cooler plates to maintain them at a temperature of not less than 1200° F. is then passed through the cascade of thermocouples supplying the heat energy which is converted to electrical energy by the thermocouples. From the last thermocouple of the cascade (the one at lowest temperature), the now cooled heat transfer media is returned to the inlet end of the heat exchange ducts in heat exchange relation with the cooler plates.

Alternatively, the heat transfer medium exiting from the converter, after abstracting heat from the cooler plates to maintain them at the desired temperature, may pass to a steam boiler, waste heat boiler, etc., so that its heat content is beneficially utilized.

While in the embodiments described, the plates are in the form of discs, it will be understood the invention is not limited thereto but includes plates of any desired shape, including cylindrical, spherical and conical shapes. As stated, the hot plate should have a work function not greater than approximately $15kT_1$, in which $k$ is Boltzmann's constant and $T_1$ is the maximum temperature in degrees Kelvin to which the hot plate is subjected in use. The cooler plate should have a work function as low as possible for optimum results and should be as uniform an absorber of electrons as possible. Satisfactory operation is obtained when the work function of the cooler plates is not greater than that of the hot plates, and preferably less than (the smaller the better) $15kT_1$, in which $k$ is Boltzmann's constant and $T_1$ is the temperature in degrees Kelvin of the hot plate. Preferably, the hot plates should have a work function of below 2.5 volts and the cooler plates a work function of below 2 volts.

Suitable materials of construction designed to fulfill their intended function and having the desired physical, electrical and heat-conducting properties should, of course, be used. The invention is, of course, not confined to the materials of construction mentioned. With the advent of new or improved materials, such materials can, of course, be used. In terms of presently available materials, the flues or ducts 18, 81 and 84, may be of a high melting point metal (e.g., above 3000° F.) such as molybdenum, tungsten, tantalum or Monel metal; the bellows may be of Monel metal or stainless steel; housing 10 of stainless steel or Kovar (a type of steel which bonds to certain magnesium-silicon-aluminum-oxide ceramics; electrical insulating material 21 may be of aluminum oxide or boron nitride; the ceramic spacers (29 and 58) and collars 25 of low heat conductivity, low coefficient of expansion material such as aluminum oxide or boron nitride. The take off leads 33, 34, 72, 73 and 94, 95, and the conductor springs 32, should be of a material having a low Wiedemann-Frang constant such as nickel or steel. The optimum (maximum efficiency) specifications for the take off leads are given by the following equation:

$$\frac{A}{L} = I_0 \sqrt{\frac{e}{K\eta(T_1 - T_2)}}$$

in which:

$A$ = cross sectional area of take off lead.
$L$ = length of conductor.
$I_0$ = output current of converter.
$e$ = electric resistivity of the lead.
$K$ = thermal conductivity of lead.
$\eta$ = thermal efficiency of the converter.
$T_1$ = hot plate temperature.
$T_2$ = cooler plate temperature.

As the electron emissive material, the following may be employed:

(1) Philips cathodes, both A and B types, which are sintered porous tungsten impregnated with various oxides, usually in the form of carbonates, which carbonates upon activation are converted to oxides; type A cathodes contain barium oxide and aluminum oxide in the mol ratio of five to two. Type B cathodes contain barium oxide, aluminum oxide and calcium oxide in the mol ratio of five to two to three;
(2) Thoriated tungsten;
(3) Tungsten coated with cesium;
(4) Thoria, i.e., ceramic $ThO_2$;
(5) Barium oxide, strontium oxide, calcium oxide, and mixtures of these oxides;
(6) Molybdenum housing or stocking filled with granules of a fused barium oxide and aluminum oxide mixture;
(7) Lanthanum oxide ($La_2O_3$);
(8) Perforated molybdenum sleeve or housing containing sintered thorium oxide; and
(9) Pure tungsten.

Some of the above materials may be best used for the hot plates, some for the cooler plates and some are suitable for both hot and cooler plates. The present order of preference, for maximum power and efficiency, are the combinations given in the table which follows:

*Table*

| | Hot Plates | Cooler Plates |
|---|---|---|
| 1 | Type A cathodes as defined above. | Cesium adsorbed on a tungsten surface. |
| 2 | -----do----- | Type B cathodes as defined above. |
| 3 | Type B cathodes as defined above. | Cesium adsorbed on tungsten. |
| 4 | Thoriated tungsten | Do. |
| 5 | Type B cathodes as defined above. | Type B cathodes as defined above. |
| 6 | -----do----- | Oxide coated nickel. |

The hot and cooler plates may be formed substantially entirely of the electron emissive materials above noted, or these materials may be fused or otherwise bonded onto a suitable carrier or support to form the electron emissive surfaces.

The hot electron emissive surfaces and the cooler electron emissive surfaces may be of the same or different materials. For operations below 2500° F. the preferred materials are the Philips or L-cathodes. For temperatures above 2500° F. thoriated tungsten is preferred for the hot plate and Philips or L-cathodes or tungsten covered with cesium for the cooler plates.

Utilizing Philips cathodes (L-cathodes) the hot surfaces are maintained within the range of from 1700° F. to 2600° F. and the cooler surfaces within the range of from 65° F. to 1500° F. Where this invention is employed in combination with one or more thermocouples or other thermoelectric generators, the cooler surfaces are usually maintained within the range of 1200° F. to 1500° F.

The hot plates or hot electron emissive surfaces made from oxides, such as barium oxide, strontium oxide, or calcium oxide, in operation, are preferably maintained at a temperature within the range of from 1100° F. to 1800° F. and the cooler plates made of or containing such oxides are maintained at a temperature within the range of from 65° F. to 700° F.

When employing thorium electron emissive materials, the temperature of the hot surfaces is maintained within the range of from 1700° F. to 3000° F. and the temperature of the cooler surfaces within the range of from 65° F. to 1600° F.

In all cases the temperature to which the hot surfaces are subjected should be such that the rate of decomposition of the electron emissive surface at such temperature will not materially reduce their life. The hot electron emissive surface or surfaces may be heated by any desired mode of heat transfer, i.e., radiation, conduction, convection or condensation, or by any combination of two or more of these methods of heat transfer.

As noted, in order to maintain the desired temperature differential, a cooling medium may be employed to effect cooling of the cooler surfaces as disclosed for example in FIGURE 5. Also, for maximum efficiency, the heat which would otherwise be wasted in the flue gases, when combustion is utilized to supply the heat, may be regenerated. Thus, for example, where hot combustion gases are used to heat the hot plates, these gases leaving the hot plates may be passed in heat exchange relation with air, oxygen or fuel employed in producing the combustion gases to preheat this air, oxygen or fuel, thus beneficially utilizing the heat in the exhaust gases. The invention comprehends the passage of liquid as well as gaseous media through the heating flue or duct, including molten metals and salts.

Any suitable source of heat may be used to heat the hot plates, for example, oil, coal, or natural gas may be burned to generate heat, nuclear heat sources, such as the heat available from reactors, heat evolved from decomposition of radioactive isotopes, or solar heat sources may be used. A.C. or D.C. current may be employed to generate the heat. Where A.C. current is used to generate the heat, the invention in effect converts the A.C. current to D.C. current with zero ripple and at any desired voltage. Utilizing D.C. current at a certain voltage as a source of heat, D.C. current with zero ripple and at any desired voltage within practical limits, is produced.

The following is an example of a thermo-electron engine based on a pilot plant operation. It will be understood this example is given only for purposes of exemplifying one of many possible embodiments of the invention, and the invention is not limited to this example.

| | |
|---|---|
| Overall diameter | 2⅜ inches |
| Overall length | 14 inches |
| Overall volume | 0.05 cubic feet |
| Overall weight | 15 lbs. |
| Electron emitting surface (both hot and cooler plates) | 180 square inches |
| Hot plate temperature | 2300° F. |
| Cooler plate temperature | 1000° F. |
| Spacing between plates | 0.001 cm. |
| Electron emissive material | L cathodes (Ba/Sr)$CO_3$ impregnated in tungsten |
| Number of hot plates | 30 |
| Number of cooler plates | 30 |
| Total power | 800 watts |
| Total voltage output | 17 volts |
| Power per unit volume | 16,000 watts/cu. ft. |
| Power per unit weight | 53 watts/lb. |
| Thermal efficiency | 10% |

FIGURE 9 is a plot based on pilot plant operation of the example above given of load output in watts against output current density in amperes per square centimeter of hot plate for a single pair of hot and cooler plates. The small circles in this graph represent points or values obtained in the pilot plant tests, and the solid line curve represents the theoretically predicted values. From the curve of FIGURE 9, it is evident that at load outputs of about .6 volt for a single pair of hot and cooler electron emissive plates current densities of more than 1 ampere are obtained per square centimeter of hot plate.

FIGURE 10 is a plot based on the same pilot plant example showing the relationship between load output on the one hand and power output and thermal efficiency on the other hand for a single pair of hot and cooler plates. The small circles in this graph represent points or values obtained in the pilot plant tests; certain of the circles, as indicated in this graph, represent the thermal efficiency values; and certain others represent power output values, as identified by appropriate legends at the base of FIGURE 10. The solid line curve in FIGURE 10 represents the theoretically predicted power values. From this figure it appears that at load outputs of about .6 volt, thermal efficiencies of 12% are obtained with power outputs of 0.7 watt per square centimeter of hot plate. By using a sufficient number of groups of hot and cooler plates, large power outputs per unit weight and/or volume of equipment are obtainable.

It will be noted that the present invention permits the utilization of a large number of electron emissive surfaces in a comparatively small volume in that the spaceing between the hot and cooler plates is so minute, less than 0.002 inch, preferably less than 0.0005 inch. Large power outputs per unit volume can, therefore, be generated, as explained above.

In that this invention can be embodied in apparatus which is compact, simple in design, devoid of intricate parts, the parts do not require precise machining and are, for all practical purposes, static, i.e., the apparatus need not involve moving mechanical parts, the apparatus is of long useful life, efficient in operation and relatively inexpensive to construct, maintain and operate.

The invention can be used to convert heat from any available high temperature heat source, including nuclear reactors and isotopes, into electrical energy. It is, therefore, particularly adapted for use as a nuclear power plant. In view of the compact design, the invention can be used to furnish electrical power to operate electronic equipment, in missiles, satellites and space traveling devices. Using A.C. current as the heat source, the present invention functions as a converter to transform the A.C. current to D.C. with zero ripple. It can be used to convert D.C. current at a given voltage to D.C. current with zero ripple at a higher or lower voltage.

Since different embodiments of the invention could be made without departing from the scope of this invention, it is intended that all matter contained in the above description or shown in the accompanying drawings shall be interpreted as illustrative and not in a limiting sense. Thus, while in the modification of FIGURE 5, hot and cooler plates are shown, each having electron emissive surfaces at the opposite sides thereof, except for the terminal plates of the group disposed in the housing, which terminal plates need have only one side of electron emissive material, and in which modification each plate is spaced from the next a distance of not greater than 0.002 inch, these plates may be arranged in pairs with the plates of each pair having the electron emissive surfaces disposed parallel and opposite each other. In such paired arrangement, each pair consisting of a hot and cooler plate, the spacing between adjacent pairs may be varied as desired. It is only the spacing between the oppositely disposed electron emissive surfaces of the hot and cooler plates that is critical and that should be not greater than 0.002 inch, preferably not greater than 0.0005 inch.

What is claimed is:

1. A process of converting thermal energy into electrical energy, which comprises heating one of two electron emissive surfaces disposed with said surfaces parallel to each other and under vacuum while maintaining the other surface at a temperature at least 350° F. below that of said heated surface, said heated surface having a work function not greater than approximately $15kT_1$, in which $k$ is Boltzmann's constant and $T_1$ is the maximum temperature in degrees Kelvin to which the heated surface is subjected, the other surface having a work function not greater than that of said heated surface, said surfaces being spaced apart less than about 0.002 inch, and taking off current from said surfaces.

2. The process as defined in claim 1, in which the work function of the said other surface is below that of said heated surface.

3. The process as defined in claim 1, in which the heat which effects the said heating of said electron emissive surfaces is derived from the decomposition of a radioactive isotope.

4. A process of converting thermal energy into electrical energy, which comprises heating one of two electron emissive surfaces disposed parallel to each other and under vacuum, to a temperature of at least 1800° F., while maintaining the other surface at a temperature of at least 350° F. below the temperature of the heated surface, said heated surface having a work function not greater than approximately $15kT_1$, in which $k$ is Boltzmann's constant and $T_1$ is the maximum temperature to which the heated surface is subjected, the other surface having a work function below that of said heated surface, said surfaces being spaced apart not more than about 0.0005 inch and taking off current from said surfaces.

5. A process of converting thermal energy into electrical energy, which comprises heating one of two electron emissive surfaces disposed parallel to each other spaced apart not more than about 0.0005 inch, to a temperature of at least 1800° F. while maintaining the other surface at a temperature of at least 350° F. below the temperature of the heated surface, the work function of the heated surface being not greater than about 2.5 volts and the work function of the other surface being not greater than about 2 volts, and maintaining said surfaces under a vacuum below $5 \times 10^{-5}$ mm. of mercury, to effect a flow of electrons from the heated surface to the other surface and taking off current from said surfaces.

6. A process of converting thermal energy into electrical energy, which comprises heating a tungsten surface impregnated with barium and strontium oxides to a temperature of from 2000° to 3000° F., said surface being separated from a similar surface in spaced parallel relationship by not more than about 0.0005 inch while said similar surface is maintained at a temperature of from 400° to 500° F. lower than the temperature of the said surface under a vacuum of not exceeding $1 \times 10^{-5}$ mm. of mercury, and taking off current from said surfaces.

7. A process of converting thermal energy into electrical energy, which comprises heating one of two electron emissive surfaces disposed parallel to each other, spaced apart not more than about 0.002 inch to a temperature within the range of 2000° to 3000° F. while maintaining the other surface at a temperature at least 350° F. below the temperature of said heated surface and within the range of 1200° to 2000° F. by passing a heat transfer medium in heat exchange relation with said other surface, the work function of the heated surface being not greater than approximately $15kT_1$, in which $k$ is Boltzmann's constant and $T_1$ is the maximum temperature to which the heated surface is subjected, and the work function of the said other surface being less than $15kT_1$, maintaining said surfaces under a vacuum below $5 \times 10^{-5}$ mm. of mercury, passing the heat transfer medium, leaving said other surface in heat exchange relation with a cascade of thermocouples at progressively lower temperatures to convert the heat removed from said other surface into electrical energy and taking off current from said surfaces.

8. A process of converting thermal energy into electrical energy, which comprises disposing in spaced apart parallel relationship normally less than about 0.002 inch apart, two electron emissive surfaces under vacuum, heating said surfaces to a temperature of at least 1800° F. to activate same, increasing the spacing between said surfaces during the activation to permit escape of gases generated during said activation from said surfaces, discontinuing said activation treatment, maintaining said surfaces spaced apart less than about 0.002 inch, heating one of said surfaces to a temperature of at least 1800° F. while maintaining the other surface at a temperature of at least 350° F. below the temperature of the heated surface, said heated surfaces having a work function not greater than approximately $15kT_1$, in which $k$ is Boltzmann's constant and $T_1$ is the maximum temperature in degrees Kelvin of said heated surface, and the other surface has a work function substantially less than that of said heated surface, maintaining the said surfaces under a vacuum of at least $5 \times 10^{-5}$ mm. of mercury, and taking off current from said surfaces.

9. Apparatus for converting thermal energy into electrical energy comprising, in combination, a housing, means for maintaining said housing under vacuum, two electron emissive surfaces therein, means for heating one of said surfaces, means for maintaining the other surface at a lower temperature than the heated surface, the heated electron emissive surface having a work function of not greater than approximately $15kT_1$, in which $k$ is Boltzmann's constant and $T_1$ is the maximum temperature to which said heated surface is subjected in use, the said other electron emissive surface having a work function not greater than that of said heated surface, means positioning said surfaces in spaced parallel relationship spaced apart less than about 0.002 inch, an insulating member separating the heated surface from the other surface so that said other surface is maintained at a temperature substantially below the temperature of the heated surface, and means for withdrawing current from said surfaces.

10. Apparatus for converting thermal energy into electrical energy, as defined in claim 9, in which said means for spacing said surfaces apart consists of a ceramic spacer of low thermal conductivity having a low coefficient of expansion.

11. Apparatus for converting thermal energy into electrical energy, as defined in claim 9, in which said electron emissive surfaces are arranged in a series of pairs including terminal end pairs and intermediate pairs, within said housing under vacuum, each pair consisting of a heated surface and a cooler scrface spaced from said heated surface, the cooler surface of each pair being positioned contiguous to a cooler surface of the next pair and the cooler surface of each pair being connected by a conductor with the heated surface of an adjacent pair, thus providing for series flow of electrons from the cooler surface of one pair to the heated surface of the next pair.

12. Apparatus for converting thermal energy into electrical energy, as defined in claim 9, in which the electron emissive surfaces are arranged in groups, each group consisting of one heated electron emissive surface between a pair of cooler electron emissive surfaces, a multiplicity of said groups being disposed within one and the same housing under vacuum arranged with two terminal groups and the remaining groups positioned between the two terminal groups, conductors connecting the cooler electron emissive surfaces of each group to the heated electron emissive surface of an adjacent group, a conductor leading from the heated electron emissive surfaces of one terminal group and a conductor leading from the connected pair of cooler electron emissive surfaces of the other terminal group.

13. Apparatus for converting thermal energy into electrical energy, comprising, in combination, a cylindrical duct for the flow therethrough of heating media, an evacuated housing through which said duct passes, a heat conducting annulus of electrical insulating material contiguous to said duct, a series of spaced annular electron emissive surfaces in heat conducting relation with said annulus and heated by the heating media in said duct, said surfaces being disposed within said housing with their peripheries spaced from the inner wall of said housing, a cooler electron emissive surface for each said heated electron emissive surface, each said cooler electron emissive surface being provided with a central opening, the wall defining which opening is spaced from said insulated annulus, each said cooler electron emissive surface being spaced from its associated heated electron emissive surfaces not more than 0.002 inch, the periphery of each of said cooler electron emissive surfaces being in heat conducting relation with the wall of said housing and ceramic spacers of low thermal conductivity and having a low coefficient of expansion separating each heated electron emissive surface from the contiguous cooler electron emissive surface.

14. Apparatus as defined in claim 13 having the said heated and cooler electron emissive surfaces mounted for relative movement to each other to permit them to be moved apart, and means to restore said surfaces to the desired spaced relation and to maintain them in this spaced relation.

15. A process of converting thermal energy into electrical energy, which comprises disposing in spaced apart parallel relationship normally not more than about 0.002 inch apart, two electron emissive surfaces under vacuum, heating said surfaces to a temperature of 2000° F. to 3000° F. under a vacuum of at least 5×10⁻⁵ mm. of mercury to activate same, increasing the spacing between said surfaces to permit escape of gases generated during said activation from said surfaces, thereafter automatically moving the activated surfaces in spaced relation to each other spaced apart not more than 0.0005 inch, heating one of said surfaces to a temperature of at least 1800° F. while maintaining the other surface at a temperature of at least 350° F. below the temperature of the heated surface, said heated surfaces having a work function not greater than approximately $15kT_1$, in which $k$ is Boltzmann's constant and $T_1$ is the maximum temperature in degrees Kelvin of said heated surface, and the other surface has a work function substantially less than that of said heated surface, maintaining the said surfaces under a vacuum of at least 5×10⁻⁵ mm. of mercury, and taking off current from said surfaces.

16. Apparatus for converting thermal energy into electrical energy comprising, in combination, an evacuated housing, two electron emissive surfaces therein having a differential temperature therebetween, the hotter electron emissive surface having a work function of not greater than approximately $15kT_1$, in which $k$ is Boltzmann's constant and $T_1$ is the maximum temperature in degrees Kelvin to which said hotter surface is subjected in use, the cooler electron emissive surface having a work function not greater than that of said hotter surface, means postioning said surfaces in spaced parallel relationship spaced apart less than 0.002 inch, said means comprising a spacer constituted of two portions extending substantially at right angles to said surfaces, one of said portions resting on the cooler surface and the other being substantially parallel to the said one surface and supporting the hotter surface, whereby expansion and contraction of said portions compensate and do not alter the spacing between said electron emissive surfaces, an insulating member separating the hotter surface from the cooler surface so that said cooler surface is maintained at a temperature substantially below the temperature of the hotter surface, and means for withdrawing current from said surfaces.

17. Apparatus for converting thermal energy into electrical energy comprising, in combination, an evacuated housing, two electron emissive surfaces therein having a differential temperature therebetween, the hotter electron emissive surface having a work function of not greater than approximately $15kT_1$, in which $k$ is Boltzmann's constant and $T_1$ is the maximum temperature in degrees Kelvin to which said hotter surface is subjected in use, the cooler electron emissive surface having a work function not greater than that of said hotter surface, means positioning said surfaces in spaced parallel relationship spaced apart less than 0.002 inch, spring means bearing against said electron emissive surfaces to maintain said surfaces in supported spaced relation to each other spaced apart a distance of not more than about 0.002 inch, an insulating member separating the hotter surface from the cooler surface so that said cooler surface is maintained at a temperature substantially below the temperature of the hotter surface, and means for withdrawing current from said surfaces.

18. Apparatus for converting thermal energy into electrical energy comprising, in combination, an evacuated housing, electron emissive surfaces in said evacuated housing arranged in an assembly with a cooler surface alternating with a heated surface and each of said heated surfaces being spaced relative to a cooler surface individual thereto a distance less than 0.002 inch, one terminal surface in said assembly being a heated electron emissive surface and the other terminal surface in said assembly being a cooler electron emissive surface, the heated electron emissive surfaces each having a work function of not greater than approximately $15kT_1$, in which $k$ is Boltzmann's constant and $T_1$ is the maximum temperature in degrees Kelvin to which said heated surface is subjected in use, the cooler electron emissive surfaces each having a work function not greater than that of the heated surface individual thereto, means for maintaining each heated surface in spaced parallel relationship relative to the cooler surface individual thereto spaced apart said distance less than 0.002 inch, an insulating member separating each heated surface from the cooler surface individual thereto so that said cooler surface is maintained at a temperature substantially below the temperature of the heated surface, conductors connecting all of said heated electron emissive surfaces, conductors connecting all of said cooler electron emissive surfaces of said assembly, and a load in circuit with said conductors.

19. A process of converting thermal energy into electrical energy which comprises disposing two electron emissive surfaces parallel to each other with a space therebetween less than 0.002 inch in extent, maintaining vacuum in said space, heating one of said surfaces, maintaining the other surface at a temperature of at least 350° F. below that of said heated surface, the said heated surface having a work function not greater than approximately $15kT_1$, in which $k$ is Boltzmann's constant and $T_1$ is the maximum temperature in degrees Kelvin to which the heated surface is subjected, and the said other surface having a work function not greater than that of said heated surface, all whereby flow of electrons from said heated surface through said evacuated space of less than 0.002 inch in extent to said other surface is effected, and taking off current from said surfaces.

References Cited in the file of this patent

UNITED STATES PATENTS

| | | |
|---|---|---|
| 2,510,397 | Hansell | June 6, 1950 |
| 2,759,112 | Caldwell | Aug. 14, 1956 |

FOREIGN PATENTS

| | | |
|---|---|---|
| 741,058 | Great Britain | Nov. 23, 1955 |
| 989,296 | France | May 23, 1951 |